(12) United States Patent
Leno

(10) Patent No.: US 10,883,609 B2
(45) Date of Patent: Jan. 5, 2021

(54) FITTING WITH MAINTENANCE OPENING

(71) Applicant: Adams GmbH, Herne (DE)

(72) Inventor: Eugen Leno, Holzwickede (DE)

(73) Assignee: Adams GmbH, Herne (DE)

( * ) Notice: Subject to any disclaimer, the term of this patent is extended or adjusted under 35 U.S.C. 154(b) by 0 days.

(21) Appl. No.: 15/770,521

(22) PCT Filed: Nov. 2, 2016

(86) PCT No.: PCT/EP2016/076341
§ 371 (c)(1),
(2) Date: Apr. 24, 2018

(87) PCT Pub. No.: WO2017/076857
PCT Pub. Date: May 11, 2017

(65) Prior Publication Data
US 2019/0056031 A1 Feb. 21, 2019

(30) Foreign Application Priority Data

Nov. 2, 2015 (DE) .......................... 10 2015 118 699

(51) Int. Cl.
| | | |
|---|---|---|
| *F16K 1/16* | (2006.01) | |
| *F16K 1/18* | (2006.01) | |
| *F16K 27/12* | (2006.01) | |
| *F16K 5/06* | (2006.01) | |
| *F16K 27/02* | (2006.01) | |
| *F16K 27/00* | (2006.01) | |

(52) U.S. Cl.
CPC .................. *F16K 1/16* (2013.01); *F16K 1/18* (2013.01); *F16K 5/0636* (2013.01);
(Continued)

(58) Field of Classification Search
CPC . F16K 1/16; F16K 1/18; F16K 5/0636; F16K 5/0642; F16K 5/0673;
(Continued)

(56) References Cited

U.S. PATENT DOCUMENTS 2,556,904 A * 6/1951 Cline ...................... F16K 15/03
137/516.29
3,340,890 A * 9/1967 Raskhodoff ............. F27D 21/02
137/315.01
(Continued)

FOREIGN PATENT DOCUMENTS

| DE | 43 02 666 A1 | 8/1994 |
|---|---|---|
| FR | 2 298 752 A1 | 8/1976 |
| FR | 2 664 350 A1 | 1/1992 |

OTHER PUBLICATIONS

International Search Report of PCT/EP2016/076341, dated Jan. 25, 2017.

*Primary Examiner* — Marina A Tietjen
*Assistant Examiner* — Frederick D Soski
(74) *Attorney, Agent, or Firm* — Collard & Roe, P.C.

(57) ABSTRACT

A fitting for shutting off and/or regulating flows of substance for use in pressure ranges above 50 bar has a housing body and a valve disc which can be operated from a drive lying outside the housing body via a valve shaft. The housing body is provided with a maintenance opening that can be shut off in a pressure-tight manner by a self-sealing lid that has a seal. In order to allow objects that are as large as possible, in particular the valve disc, to be guided through the maintenance opening during inspection works, without increasing the weight of the housing body, the maintenance opening has a rectangular passage cross section. In contrast to known circular maintenance openings which are known in this pressure range, a rectangular passage cross section permits a smaller surface area for the passage cross section and therefore a lighter housing body.

5 Claims, 5 Drawing Sheets

(52) U.S. Cl.
CPC .......... *F16K 5/0642* (2013.01); *F16K 5/0673* (2013.01); *F16K 27/006* (2013.01); *F16K 27/02* (2013.01); *F16K 27/0209* (2013.01); *F16K 27/12* (2013.01); *Y10T 137/8359* (2015.04)

(58) Field of Classification Search
CPC .... F16K 27/006; F16K 27/02; F16K 27/0209; F16K 27/12; Y10T 137/8359
See application file for complete search history.

(56) References Cited

U.S. PATENT DOCUMENTS

| | | | |
|---|---|---|---|
| 3,410,422 A | 11/1968 | Carpentier | |
| 5,374,028 A * | 12/1994 | Neubold | F16K 1/42 251/159 |
| 5,406,979 A * | 4/1995 | McHugh | A62C 35/68 116/274 |
| 5,653,207 A * | 8/1997 | Denton | F02D 17/04 123/198 D |
| 6,557,645 B1 * | 5/2003 | Ringer | A62C 35/62 137/516.25 |
| 8,177,189 B2 * | 5/2012 | Jackson | A62C 35/68 251/73 |
| 8,733,733 B2 * | 5/2014 | Collison | F16K 5/0678 251/174 |
| 2003/0183284 A1 * | 10/2003 | Mambrini | F16K 1/2021 137/613 |
| 2015/0247583 A1 * | 9/2015 | Garnett | F16K 15/03 137/15.04 |
| 2018/0195626 A1 * | 7/2018 | Han | F16K 11/056 |

* cited by examiner

Figure 1:
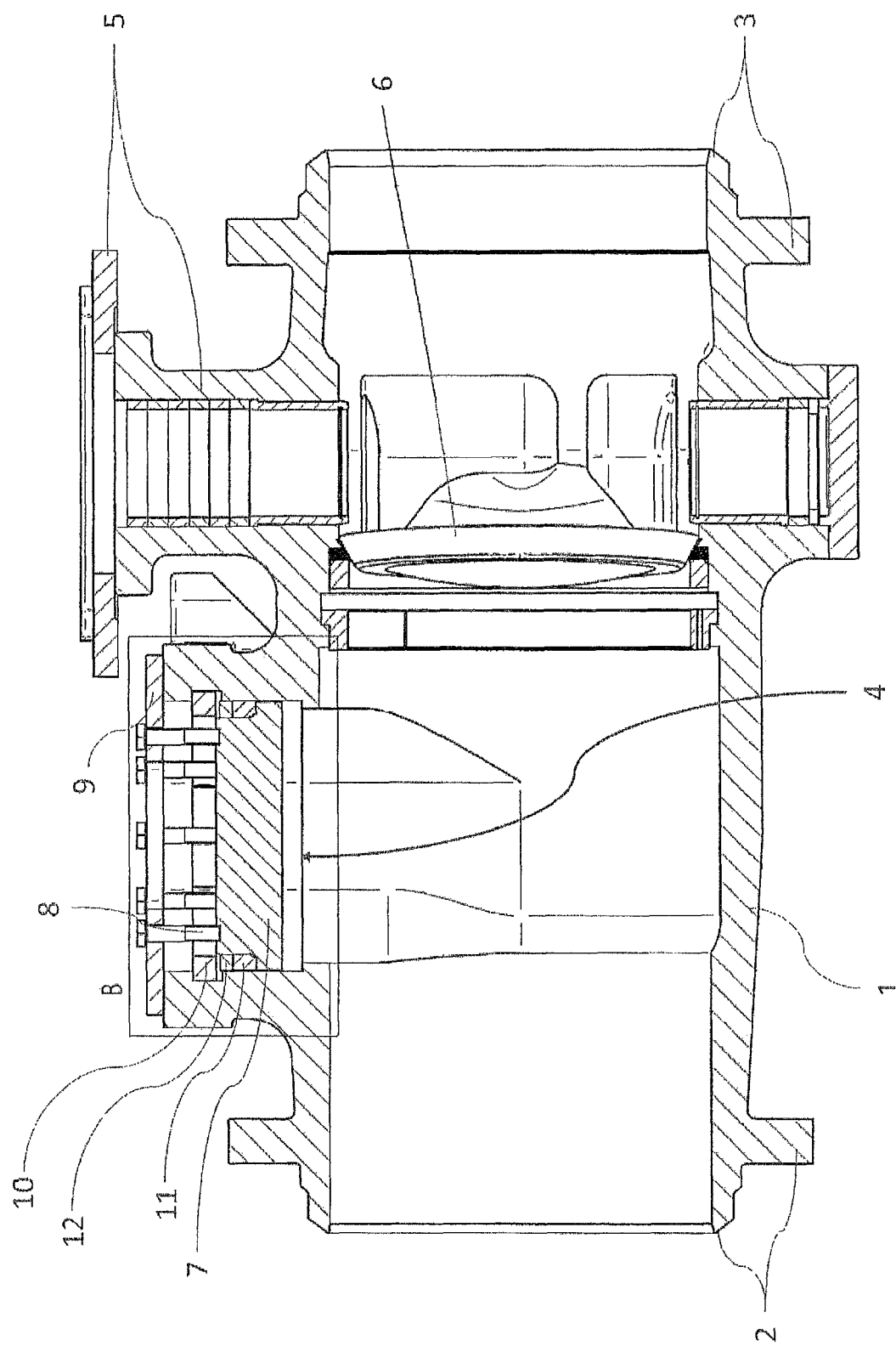

Detail B from FIG 1

FITTING WITH MAINTENANCE OPENING

CROSS REFERENCE TO RELATED APPLICATIONS

This application is the National Stage of PCT/EP2016/076341 filed on Nov. 2, 2016, which claims priority under 35 U.S.C. § 119 of German Application No. 10 2015 118 699.3 filed on Nov. 2, 2015, the disclosure of which is incorporated by reference. The international application under PCT article 21(2) was not published in English.

The invention relates to a fitting for blocking off and/or regulating material streams, for use in pressure ranges above 50 bar, having a housing body and a valve disk, which can be operated by a drive that lies outside of the housing body, by way of a valve shaft, wherein the housing body is provided with a maintenance opening that can be closed off in pressure-tight manner by means of a self-sealing lid closure that has a seal.

Such a fitting is known, for example, from DE 43 02 666 A1. Here, a fitting is described, the housing body of which has a maintenance opening having a circular shape. This circular shape for maintenance openings is considered necessary by experts in the case of self-sealing high-pressure lid closures, because in this case, the forces that occur due to the pressure impact have a circular-symmetrical effect on the maintenance opening and its closure elements. The thermal stresses that occur at changing temperatures are also distributed over the circumference with circular symmetry. The design of the maintenance opening and its closure can therefore be calculated in relatively simple manner.

A disadvantage of the circular shape of the maintenance opening consists in that the diameter of the maintenance opening must be adapted to the maximal one-dimensional expanse of the objects that are supposed to be passed through the maintenance opening during inspection work. From this, it follows that the entire surface area of the maintenance opening increases quadratically with the maximal one-dimensional expanse of these objects. Thus, for example in the case of a circular shut-off valve, the passage cross-section of a circular maintenance opening would be greater than the passage cross-section of the fitting. As a result, the housing body of the fitting and the closure elements of the maintenance opening would become extraordinarily large and heavy. The resulting costs with regard to material expenditure and logistics are significant. Furthermore, the local conditions in the field of use of the fitting often limit this fitting with regard to its dimensions and weight.

It is therefore the task of the invention to further develop the fitting to the effect that it has a maintenance opening having a one-dimensional expanse that is as great as possible, without significantly increasing the dimensions and the weight of the housing body.

To accomplish this task, the invention proposes that the maintenance opening has a rectangular passage cross-section.

In the case of a rectangular passage cross-section, the surface area of the maintenance opening increases only linearly with the maximal one-dimensional expanse of the objects that need to be introduced into the fitting during inspection work or replaced on the fitting, since only a side length of the rectangle needs to be adapted accordingly. The entire dimensions and the weight of the fitting can therefore remain in an acceptable range. The design of the seal combination required in this regard can be determined by modern computer-supported simulation methods in spite of the rectangular shape.

It is practical if the length of the maintenance opening transverse to the flow-through direction of the fitting corresponds at least to the diameter of the valve disk of the fitting, while the width of the maintenance opening in the flow-through direction of the fitting corresponds at least to the thickness of the valve disk. This dimensioning makes it possible to replace the valve disk during inspection work or to lift it out of the fitting for more extensive maintenance measures, and to insert it again later. Since the thickness of the valve disk is significantly smaller than its diameter, the required total surface area of the rectangular maintenance opening is also significantly smaller than that of a sufficiently large circular maintenance opening.

Preferably, the corners of the maintenance opening are rounded off. As a result, the forces during pressure application and the thermal stress are distributed better. In this way, the fitting can be used in a temperature range of −196° C. to 550° C. and in a pressure range up to 150 bar.

It is also practical if the rounded-off corners of the maintenance opening have the shape of an arc having the same radius, in each instance. As a result, the maintenance opening retains the two axes of symmetry of the rectangle in spite of the rounded-off corners. The stresses are therefore distributed uniformly, in a manner that can be calculated.

From experiments and calculations, it has been shown that it is particularly advantageous if the arc-shaped rounded corners of the maintenance opening have at least a radius that corresponds to triple the width of the seal.

An exemplary embodiment of the invention will be explained in greater detail below, using drawings.

Figure 2:
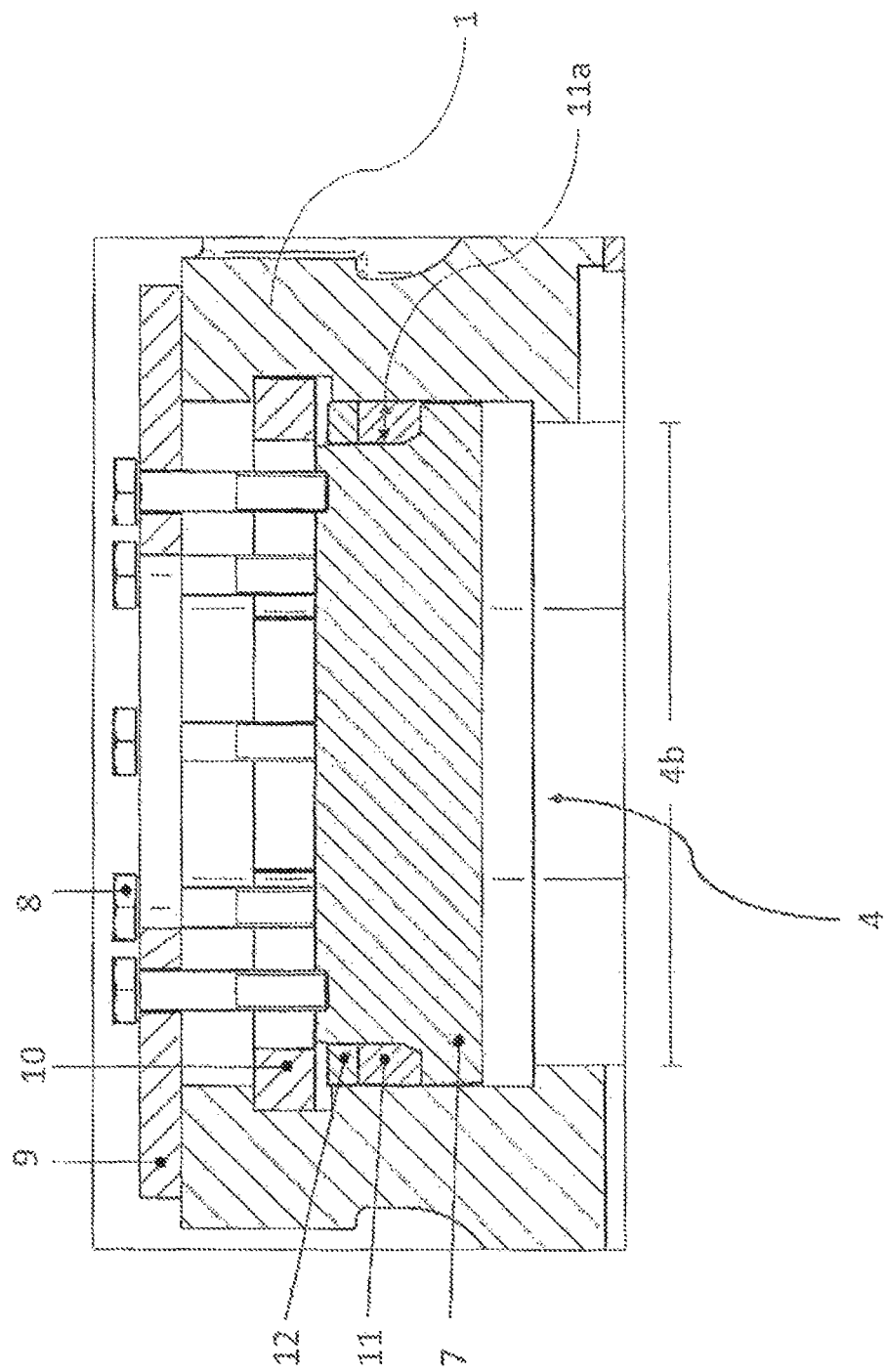
Figure 3:
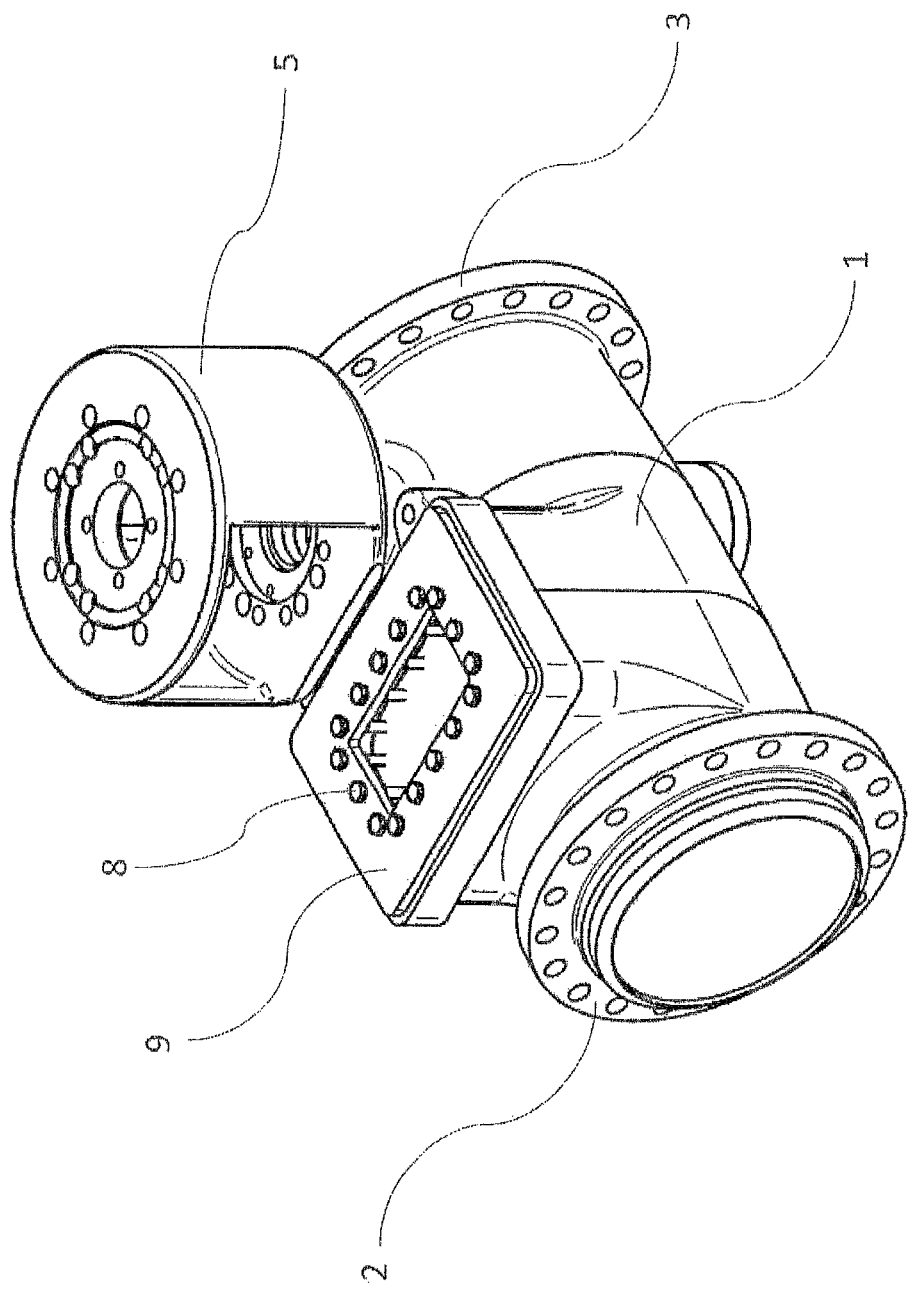
Figure 4:
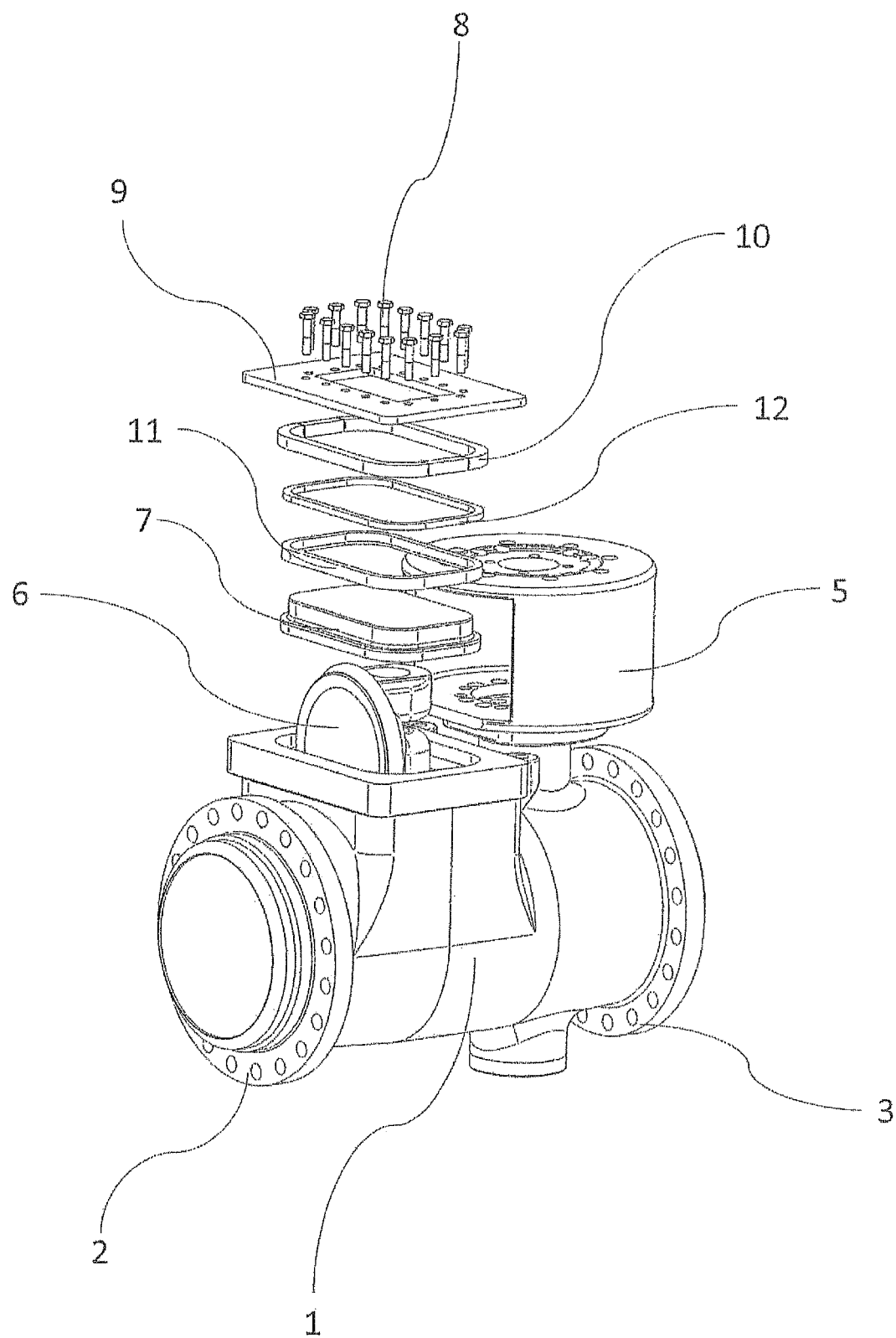
Figure 5:
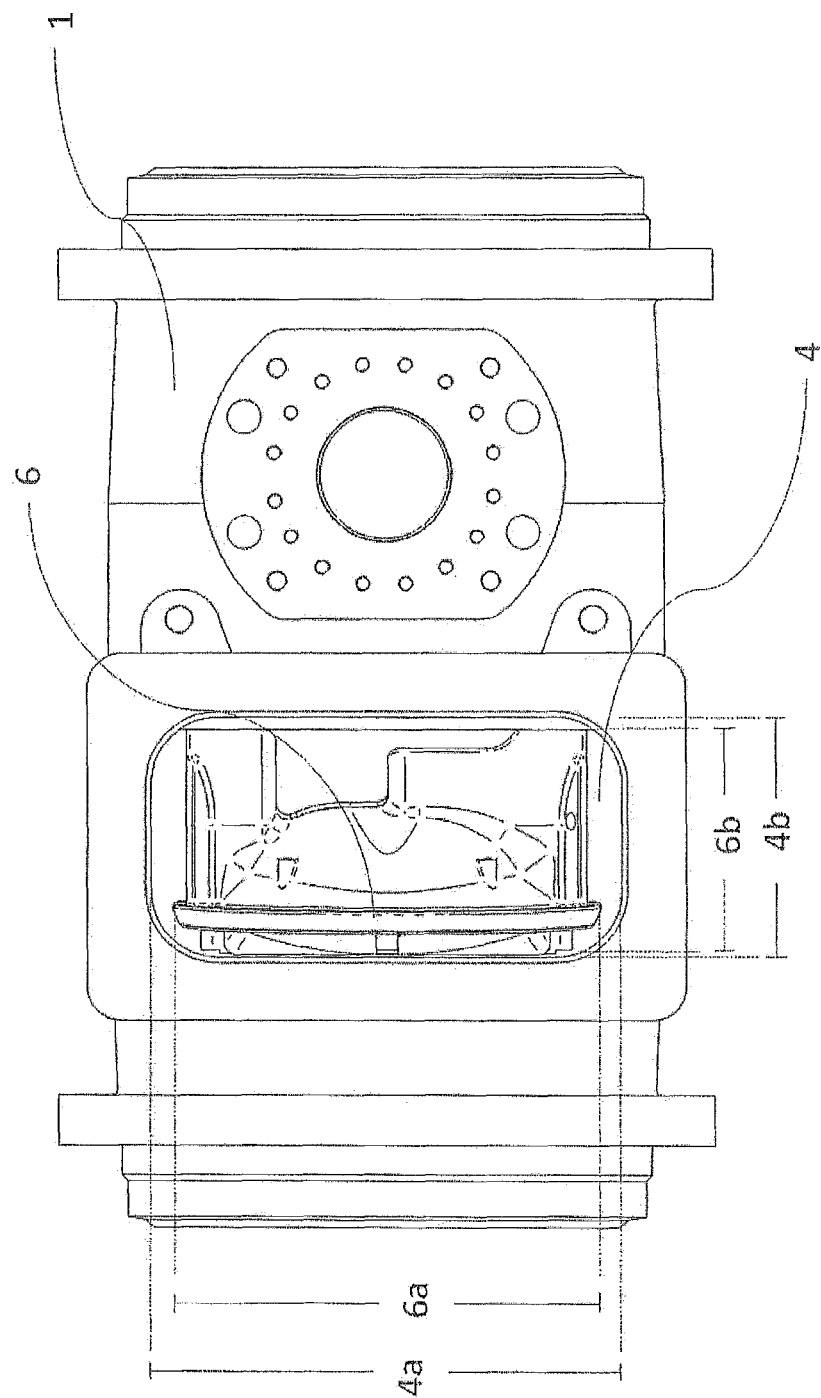

These show:

FIG. 1: Schematically, a cross-section along the axis of the fitting according to the invention;

FIG. 2: Enlarged, Detail B from FIG. 1;

FIG. 3: Schematically, a 3D outside view of the exemplary embodiment;

FIG. 4: Schematically, an exploded drawing of the exemplary embodiment and of the removal procedure of the valve disk;

FIG. 5: Schematically, a top view of the maintenance opening during the removal procedure of the valve disk.

In the drawing, the housing body of a fitting according to the invention is indicated with the reference symbol 1. The housing body 1 has two installation ends 2 and 3, which can be connected, particularly welded, to an incoming pipeline, not shown, and an outgoing further pipeline, also not shown. Furthermore, the housing body is provided with a rectangular maintenance opening 4, the function and dimensions of which will be explained below. Finally, the housing body 1 is provided with a flange connection 5 that serves for installation of a drive apparatus, not shown, for a valve disk 6 disposed in the interior of the housing body 1.

FIG. 1 shows a section along the axis of the fitting. The valve disk 6, shown here in the shut-off position, is releasably connected with its drive apparatus and can be removed and installed, if necessary, through the maintenance opening 4. In FIG. 1, the maintenance opening 4 is closed off by means of a closure lid 7. The closure lid 7 is held in position by means of a self-sealing Brettschneider closure arrangement, which is fundamentally known.

In FIG. 2, the region B of FIG. 1 is shown enlarged, and shows the maintenance opening 4 and the Brettschneider closure arrangement in detail. In this arrangement, the closure lid 7 is braced against a seal 11 and a pressure ring 12 by means of lid bracing screws 8, a bracing ring 9, and a clamping ring 10, in order to achieve the required pre-deformation for adaptation of the sealing surfaces. When pressure is applied to the fitting, the lid closure 7 is pressed further upward against the seal 11, so that the entire Brettschneider closure arrangement is self-sealing as the pressure increases.

FIG. 3 schematically shows a 3D outside view of the housing body 1 of the fitting, with the Brettschneider closure arrangement mounted on the rectangular maintenance opening 4.

FIG. 4 is an exploded drawing of the Brettschneider closure arrangement. Furthermore, the removal procedure of the valve disk 6 from the housing body 1 is illustrated schematically. As can further be seen in FIG. 4, the corners of the maintenance opening 4 are rounded off, specifically with the same rounding radius at all the corners. This rounding radius has the dimension of three times the width 11*a* of the seal 11 (cf. FIG. 2) of the Brettschneider closure arrangement. The individual rectangular elements of the Brettschneider closure arrangement are accordingly rounded off to match. The valve disk 6 is passed through the rectangular passage cross-section of the maintenance opening 4.

This procedure is also shown in FIG. 5, in a top view. The length 4*a* of the maintenance opening 4, measured transverse to the flow-through direction of the fitting, is adapted to the diameter 6*a* of the valve disk 6, i.e. slightly greater than it, while the width 4*b* of the maintenance opening 4, measured in the flow-through direction of the fitting, in contrast is adapted to the thickness 6*b* of the valve disk 6, i.e. is slightly greater than it. In total, this results in a maintenance opening 4, the dimension of which, in the flow-through direction of the fitting, is relatively small.

In contrast, a circular maintenance opening would need to have a diameter that corresponds at least to the diameter of the circular valve disk. In this regard, the maintenance opening would extend significantly further in the flow-through direction of the fitting. For this purpose, the dimensioning of the housing body would have to be increased accordingly. The entire fitting would therefore need to be designed to be larger and thus significantly heavier.

REFERENCE SYMBOL LIST

1 housing body
2 installation end
3 installation end
4 maintenance opening
4*a* length of the maintenance opening
4*b* width of the maintenance opening
5 flange connector
6 valve disk
6*a* diameter of the valve disk
6*b* thickness of the valve disk
7 closure lid
8 lid bracing screws
9 bracing ring
10 clamping ring
11 seal
11*a* width of the seal
12 pressure ring

The invention claimed is:

1. A fitting for blocking off and/or regulating material streams, for use in pressure ranges above 50 bar, the fitting comprising:
    a housing body having a maintenance opening;
    a flange connection;
    a self-sealing lid closure connected to the housing body by clamping screws and a bracing ring; and
    a valve disk;
    wherein the flange connection serves for installation of a drive apparatus for the valve disk;
    wherein the maintenance opening is arranged spaced apart from the flange connection;
    wherein the maintenance opening is closed off in pressure-tight manner at pressure ranges above 50 bar via the self-sealing lid closure;
    wherein the self-sealing lid closure has a seal that self-seals as pressure increases;
    wherein the seal, a pressure ring, and a clamping ring are arranged between the bracing ring and the self-sealing lid closure;
    wherein the self-sealing lid closure, the clamping ring, the seal, the pressure ring, and the bracing ring have a rectangular structure; and
    wherein the maintenance opening has a rectangular cross-section.

2. The fitting according to claim 1, wherein a length of the maintenance opening transverse to a flow-through direction of the fitting corresponds at least to a diameter of the valve disk of the fitting, and a width of the maintenance opening in the flow-through direction of the fitting corresponds at least to a thickness of the valve disk.

3. The fitting according to claim 1, wherein corners of the maintenance opening are rounded off.

4. The fitting according to claim 3, wherein the corners of the maintenance opening have a shape of an arc having an individual radius, in each instance.

5. The fitting according to claim 4, wherein the corners of the maintenance opening have at least a radius that corresponds to three times a width of the seal.

* * * * *